US012769472B2

(12) United States Patent
Udaya et al.

(10) Patent No.: US 12,769,472 B2
(45) Date of Patent: Oct. 20, 2026

(54) SYSTEMS AND METHODS FOR PARALLEL TRANSPORT OF DATA BETWEEN COMPUTER SYSTEMS

(71) Applicant: SAP SE, Walldorf (DE)

(72) Inventors: Sahana Durgam Udaya, Bangalore (IN); Suneel Sristi, Bangalore (IN)

(73) Assignee: SAP SE, Walldorf (DE)

( * ) Notice: Subject to any disclaimer, the term of this patent is extended or adjusted under 35 U.S.C. 154(b) by 336 days.

(21) Appl. No.: 18/531,289

(22) Filed: Dec. 6, 2023

(65) Prior Publication Data

US 2025/0190130 A1 Jun. 12, 2025

(51) Int. Cl.
*G06F 9/46* (2006.01)
*G06F 3/06* (2006.01)

(52) U.S. Cl.
CPC .......... *G06F 3/0647* (2013.01); *G06F 3/0604* (2013.01); *G06F 3/067* (2013.01)

(58) Field of Classification Search
CPC ....... G06F 3/0647; G06F 3/0604; G06F 3/067
See application file for complete search history.

(56) References Cited

U.S. PATENT DOCUMENTS 6,564,261 B1 5/2003 Gudjonsson et al.
10,664,451 B1 5/2020 Liao et al.
2002/0083124 A1 6/2002 Knox et al.
2005/0203887 A1 9/2005 Joshi et al.
2007/0156633 A1 7/2007 Sugita
2009/0037373 A1 2/2009 Gilbert
2009/0254572 A1 10/2009 Redlich et al.
2010/0250497 A1 9/2010 Redlich et al.
2012/0030167 A1 2/2012 Appiah
2012/0185448 A1 7/2012 Mensch et al.
2013/0139241 A1 5/2013 Leeder
2013/0159062 A1 6/2013 Stiehl
2013/0191519 A1 7/2013 Chang et al.
2013/0262392 A1 10/2013 Vibhor et al.
2014/0359576 A1 12/2014 Rath et al.
2015/0074286 A1 3/2015 Anschutz
2015/0120649 A1 4/2015 Nakadai
2015/0236907 A1 8/2015 Popli
(Continued)

FOREIGN PATENT DOCUMENTS

CN 115063026 A 9/2022
GB 2375006 A1 10/2002
(Continued)

OTHER PUBLICATIONS

The extended European search report of Application No. 24210027.9 dated May 12, 2025. 13 pages.
(Continued)

*Primary Examiner* — Gregory A Kessler
(74) *Attorney, Agent, or Firm* — Fountainhead Law Group, PC

(57) ABSTRACT

Embodiments of the present disclosure include techniques for moving data. In one embodiment, computer systems import and/or export data. The computer systems may be application servers coupled to a content management system accessible over a plurality of tenant frontends. The data movement may use a plurality of jobs executing in parallel to move packages of content between the systems. In one embodiment, before a job is executed, a check is made of other jobs to ensure any overlap does not cause data conflicts.

20 Claims, 8 Drawing Sheets

(56) References Cited

U.S. PATENT DOCUMENTS

| | | | |
|---|---|---|---|
| 2016/0110828 | A1 | 4/2016 | Master et al. |
| 2017/0195373 | A1 | 7/2017 | Toh et al. |
| 2018/0081905 | A1 | 3/2018 | Kamath et al. |
| 2019/0303445 | A1 | 10/2019 | Padmanabhan |
| 2020/0092177 | A1 | 3/2020 | Marvin et al. |
| 2020/0118330 | A1 | 4/2020 | Connelly et al. |
| 2020/0242481 | A1 | 7/2020 | Kim et al. |
| 2021/0058447 | A1 | 2/2021 | Trufasiu et al. |
| 2021/0109862 | A1 | 4/2021 | Yang et al. |
| 2021/0134407 | A1 | 5/2021 | Vera-Ciro et al. |
| 2021/0168128 | A1 | 6/2021 | Carru et al. |
| 2021/0385252 | A1 | 12/2021 | Lebin et al. |
| 2021/0399877 | A1 | 12/2021 | Ohashi et al. |
| 2021/0406397 | A1 | 12/2021 | Brazeau et al. |
| 2022/0027509 | A1 | 1/2022 | Amico |
| 2022/0076240 | A1 | 3/2022 | Ghani et al. |
| 2022/0086139 | A1 | 3/2022 | Venkatesh et al. |
| 2022/0245290 | A1 | 8/2022 | Luciani |
| 2023/0007483 | A1 | 1/2023 | Mueck et al. |
| 2023/0098596 | A1 | 3/2023 | Karri et al. |
| 2024/0069234 | A1 | 2/2024 | Meenakshi Sundaram Gandhi et al. |
| 2024/0333822 | A1 | 10/2024 | Parla et al. |
| 2024/0419456 | A1 | 12/2024 | Eberlein |

FOREIGN PATENT DOCUMENTS

| | | | |
|---|---|---|---|
| JP | 2008-084182 | A2 | 4/2008 |
| JP | 4444518 | B2 | 3/2010 |

OTHER PUBLICATIONS

Bigstar: “Site to site transfers (FXP)—1-15 INV. Flash FXP Forums”, Apr. 22, 2014 (Apr. 22, 2014), pp. 1-2, XP093246533, The Way back machine Retrieved from the Internet: URL:https://web.archive.org/web/20140718041834/https://www.flashfxp.com/forum/flashfxp/frequently-asked-questions-faq-/14656-site-site-transfers-fxp.html [retrieved on Feb. 4, 2025].

Cppcis231: “How to FTP and FXP”, 1-15, Mar. 5, 2012 (Mar. 5, 2012), XP093246544, Retrieved from the Internet: URL:https://www.youtube.com/watch?v=6XXQge RWWRw [retrieved on Feb. 4, 2025].

The extended European search report of Application No. 24206608.2 dated Mar. 10, 2025. 6 pages.

Stefan Momma, Enterprise Content Management for SAP, Redbook,50 pages, Sep. 15, 2015. (Year: 2015).

Lomotey, Richard K., and Ralph Deters. “Reliable consumption of web services in a mobile-cloud ecosystem using 1 REST.” In 2013 IEEE Seventh International Symposium on Service-Oriented System Engineering, pp. 13-24. IEEE, 2013. (Year: 2013).

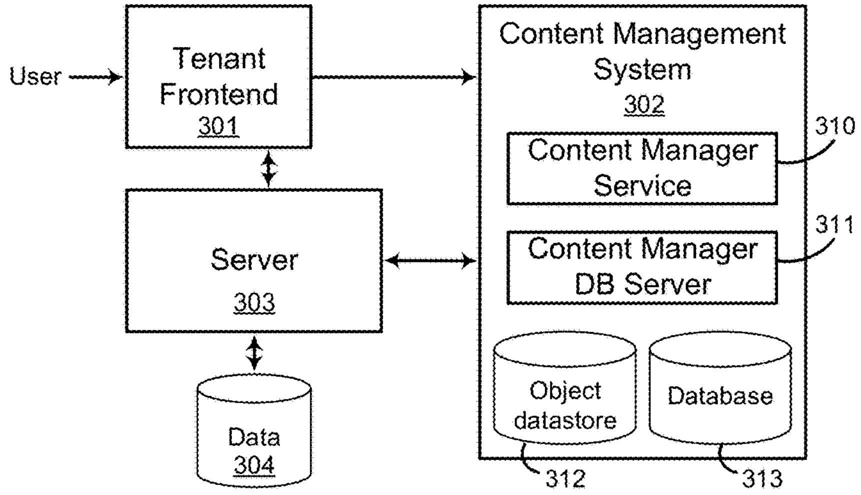

Fig. 3A

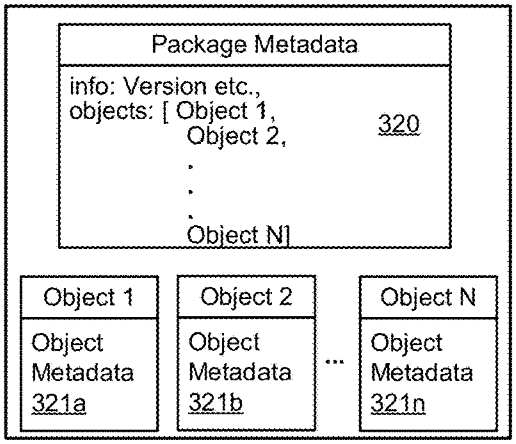

Fig. 3B

```
{
        "info": {
          /* Package version information */
        },
        "objects": [
          {
            "objectType": "RESOURCE",
            "objectName": "Annual Reports",
            "objectId": "objectIdA",
            "parentResId": "PUBLIC",
            "ancestorPath": [ ]
          },
          {
            "objectType": "RESOURCE",
            "objectName": "New Story",
            "objectId": "objectIdC",
            "parentResId": "objectIdB",
            "ancestorPath": [ ]
          },
          {
            "objectType": "RESOURCE",
            "objectName": "Finance Reports",
            "objectId": "objectIdB",
            "parentResId": "objectIdA",
            "ancestorPath": [ ]
          },
        ]
}
```

Fig. 3C

Fig. 3D

SYSTEMS AND METHODS FOR PARALLEL TRANSPORT OF DATA BETWEEN COMPUTER SYSTEMS

CROSS REFERENCE TO RELATED APPLICATIONS

This application is related to, and concurrently filed with, U.S. patent application Ser. No. 18/531,384, filed Dec. 6, 2023, now issued as patent No.: U.S. Pat. No. 12,438,869, the disclosure of which is hereby incorporated herein by reference.

This application is related to, and concurrently filed with, U.S. patent application Ser. No. 18/531,332, filed on Dec. 6, 2023, now issued as patent No. 12,603,934, the disclosure of which is hereby incorporated herein by reference.

This application is related to, and concurrently filed with, U.S. patent application Ser. No. 18/531,354, filed on Dec. 6, 2023, now issued as U.S. Pat. No. 12,578,893, the disclosure of which is hereby incorporated herein by reference.

This application is related to, and concurrently filed with, U.S. patent application Ser. No. 18/531,369, filed on Dec. 6, 2023, now issued as U.S. Pat. No. 12,639,463, the disclosure of which is hereby incorporated herein by reference.

BACKGROUND

The present disclosure relates generally to software systems, and in particular, to systems and methods for parallel transport of data between computer systems.

Computer systems require data to produce useful and meaningful results. Data preparation and analytics can involve complex, time consuming preparation of relations, visualizations, and compilations of data. When data is prepared in such a way, it may be beneficial to share the data across multiple computer systems. However, moving complex data structures across different systems can be a challenge. One particular challenge is to ensure that the latest version of data is transported. In some cases, data being transported may be an older version. Accordingly, new data can be overwritten with old data and/or old data may be retrieved from a system when newer data was available.

The present disclosure addresses these and other challenges and is directed to techniques for moving data between computer systems.

BRIEF DESCRIPTION OF THE DRAWINGS

FIG. 3A illustrates an example system according to another embodiment.

FIG. 3B illustrates an example package according to an embodiment.

FIG. 3C illustrates an example data object according to an embodiment.

FIG. 3D illustrates a transport process according to an embodiment.

DETAILED DESCRIPTION

Described herein are techniques for backing up data. In the following description, for purposes of explanation, numerous examples and specific details are set forth in order to provide a thorough understanding of some embodiments. Various embodiments as defined by the claims may include some or all of the features in these examples alone or in combination with other features described below and may further include modifications and equivalents of the features and concepts described herein.

Figure 1:
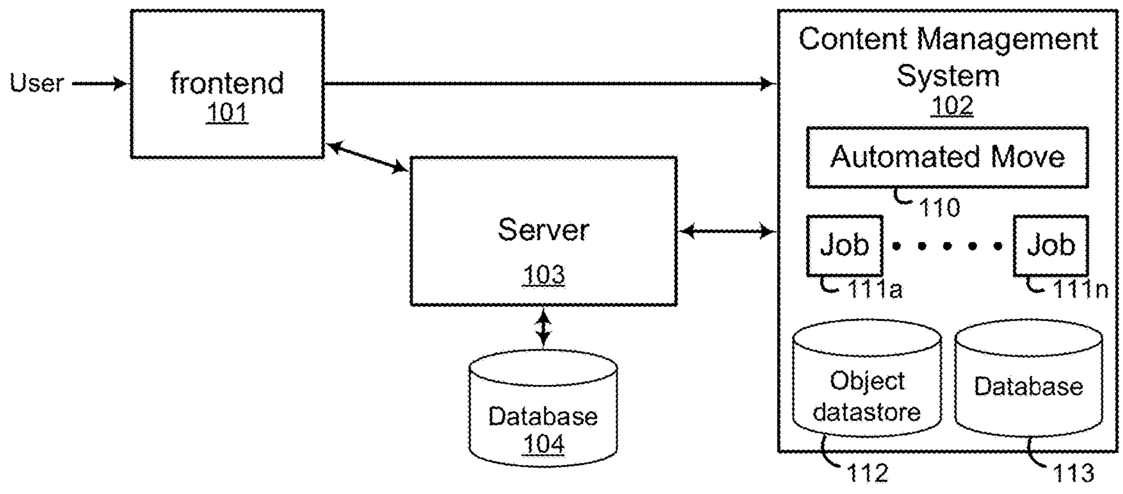
FIG. 1 illustrates a system for moving data according to an embodiment.

FIG. 1 illustrates a system for moving data according to an embodiment. Features and advantages of the present invention include techniques for moving data between computer systems using an automated process. The process may prevent incorrect versions of data from being moved to advantageously ensure that the data move from one computer system to another computer system is the correct version and/or prevent overwrites, for example. A user may interface with the computer systems using a frontend 101. Frontend 101 may include a user interface (UI) 101*a* that allows the user to access other computer systems, such as computer system 102 and/or computer system 103. In some embodiments, computer system 103 may be an application server (aka, backend) storing application data in database 104. An example application server is a server that hosts applications or software that delivers a business application through a communication protocol. Further, in some embodiments, computer system 102 may be a content management system. Example content management systems (CMS) are applications that are used to manage content, allowing multiple contributors to create, edit and publish. Content in a CMS is typically stored in a database and displayed in a presentation layer based on a set of templates like a website, which may be accessed over frontend 101, for example. Content management system 102 may include a database 113 and object datastore 112. Object datastore 112 may store objects, which are data structures holding multiple attributes of data and metadata, for example.

In various embodiments, the user may use the techniques described herein to move data from content management system 102 to server 103 (e.g., data import to server) or to move data from server 103 to content management system 102 (e.g., data export from server). Content management system 102 may similarly import data from a server or export data to a server, for example. In some embodiments, users of multiple different application servers 103 may store data generated locally on server 103 in a content management system 102 to share data with other users on other applications servers (not shown). Accordingly, it may be desirable to import and export data between content management system 102 and server 103. In some embodiments, the data may comprise data packages. Data packages passed between computer systems may include a plurality of data objects, metadata describing the plurality of data objects and dependencies between the data objects, and information summarizing the data package. Example objects in object data store that may be shared include objects corresponding to complex analytics content (e.g., models, stories, visualizations, dimensions, connections, etc. of data) that may be used to discover the unseen data patterns to boost the business productivity, for example.

To facilitate movement of data between systems, content management system 102 includes an automated move process 110. In various embodiments, data movement between the systems may include initiating automated process 110 to move data between a first computer system and a second computer system. Advantageously, data may be moved in parallel. For example, automated process 110 may instantiate a plurality of jobs 111*a-n* to move data units between the first computer system and the second computer system. In some embodiments, the data units are data packages comprising a plurality of data objects, metadata describing the plurality of data objects and dependencies between the data objects, and information summarizing the data package. Each job 111*a-n* may assemble and move one data package for example. However, because the data is shared, in various scenarios it may be desirable to ensure that the data being moved is a latest version and/or that other users are not modifying the data in the process of being moved, for example. Thus, prior to execution of each job 111*a-n*, the system may determine if an overlap exists between data units of the jobs. For instance, if one job is moving data off the content management system while another job is moving a modified version of the same data off the content management system, the overlap may be detected. A job may be executed when no overlap exists between data units moved by any of the currently executing jobs 111*a-n* and a particular job to be executed, for example. Further examples and advantages of the present techniques are described further below.

Figure 2:
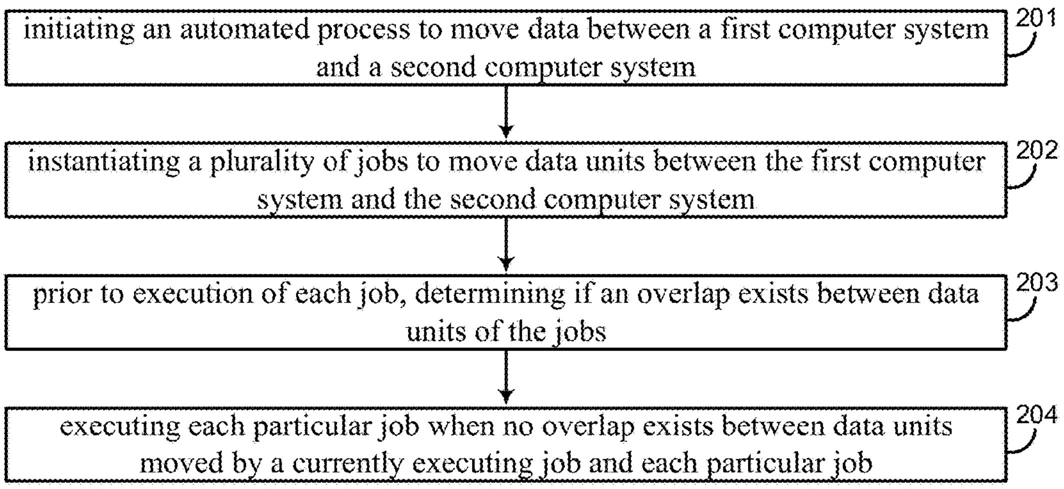
FIG. 2 illustrates a method for moving data according to an embodiment.

FIG. 2 illustrates a method for moving data according to an embodiment. At 201, the system initiates an automated process to move data between a first computer system and a second computer system. At 202, the system instantiates a plurality of jobs to move data units between the first computer system and the second computer system. At 203, prior to execution of each job, the system determines if an overlap exists between data units of the jobs. At 204, the system executes each particular job when no overlap exists between data units moved by a currently executing job and each particular job.

FIG. 3A illustrates an example database system according to another embodiment. In this example, a user accesses a content management system 302 and server 303 over a tenant frontend 301. Content management system 302 includes a content manager service 310, content manager database (DB) server 311, object datastore 312, and database 313.

The present disclosure may be used in the context of an analytics content network in a cloud computer system that combines business intelligence (BI) and planning and predictive capabilities, for example. In any business intelligence application, the analytics content (model, story, visualizations, etc.) plays the central role in discovering the unseen patterns to boost the business productivity. Hence sharing of the analytics content across users is very helpful for better collaboration. Also, a standard content template can be reused by all user by plugging their corresponding data. This infrastructure for sharing the analytics content is sometimes referred to as an "Analytical Content Network" (ACN). The content entity that contains content to be shared is called "package."

ACN may be arranged landscapes as a central component, all of which are connected. An application landscape is a coherent set of interconnected applications often within an enterprise, business, or organization, which are often associated with different geographical regions, for example. Logically ACN is "one global content network" which can provision or share any content with servers and users across landscapes. ACN may supports the following end-user workflows. A content creator creates content in the form of stories, models, dimensions, connections, Value-Driver Trees (VDT) etc. If authorized, the user can then export this content from a tenant (a portion of system resources securely assigned to a particular group) to ACN by creating a "content package," which can contain any number of these content items and share this with multiple other tenants, for example. Another SAC Content user can view all available content packages in their listing and import those packages relevant for their analytic workflows. This includes Public content (Templates or Demo content) and Private Content (shared privately with them). To achieve sharing across tenants, the content is bundled in what is referred to as a "package." A package may contain the details of each object present in the package, the dependency information between those objects, and an overview which summarizes the content details, for example. Data objects are stored in datastore 312 and data describing the data objects and packages may be stored in database 313, for example. An example package is shown in FIG. 3B comprising package metadata 320, and data objects 321*a-n*, which include object metadata, for example. An example data object 321*x* is shown in FIG. 3C.

Embodiments of the present disclosure may include three steps for transportation of data content and objects across tenants as shown in FIG. 3D. At 330, a source creates a package, at 331, the source shares the package to a destination, and at 332, the target imports the package.

Figure 4A:
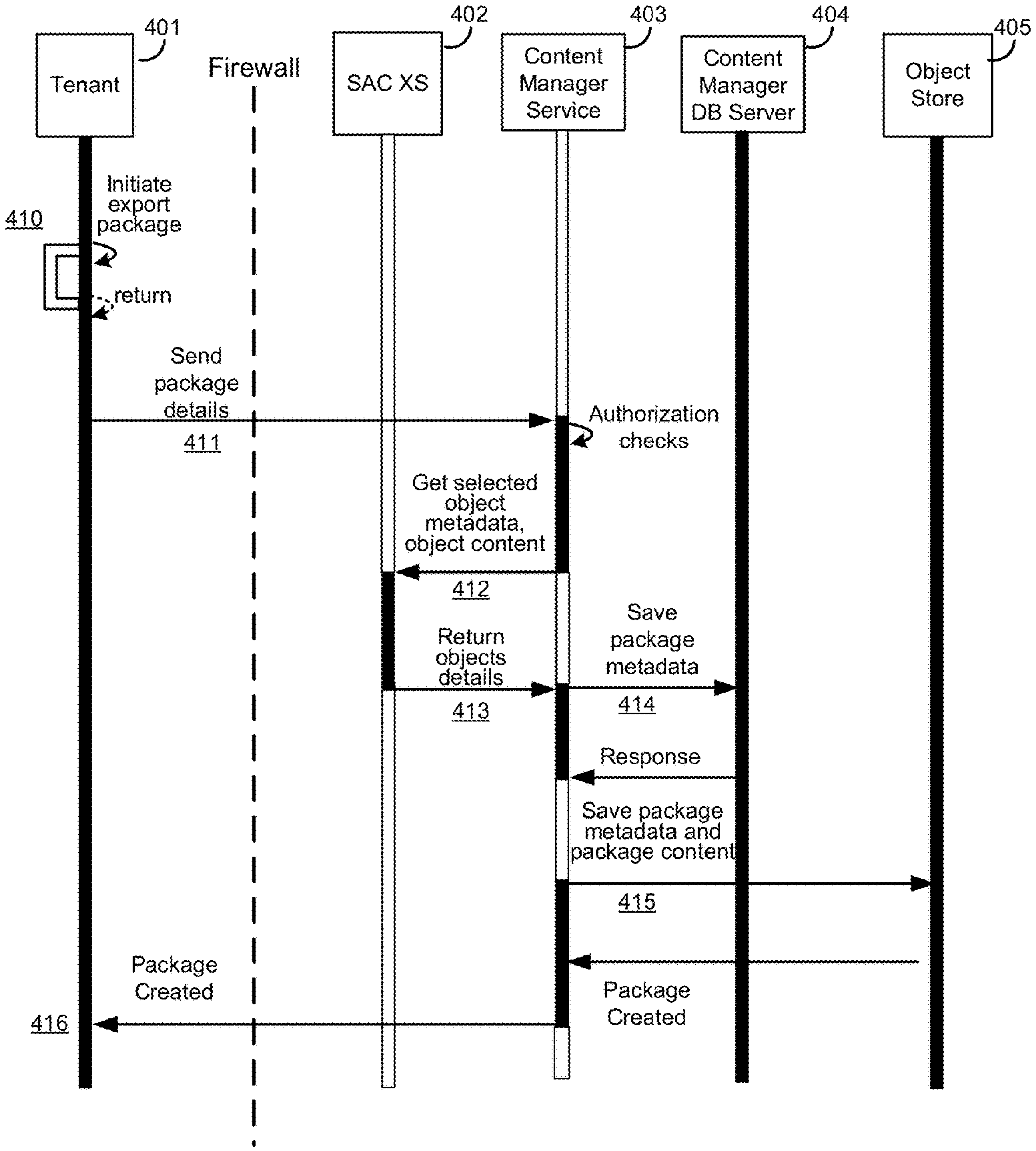
FIG. 4A illustrates an example flow diagram for creating a data package according to an embodiment.

FIG. 4A illustrates an example flow diagram for creating a data package according to an embodiment. A user logs-in to tenant frontend 401 and clicks on a "New Export" option to create a new package at 410. The user then selects objects like story, model, dimension, currency, roles, folder, etc. at 411. The user may provide information like package name, description, details, and may optionally share with particular destinations (e.g., landscapes, servers, other users), for example. The user may review the package summary and export the package to create a new package. At 412, content manager service 403 gets selected objects, metadata, and object content from server 402. The content is sent from server 402 to service 403 at 413. Package metadata is saved by service 403 in content manager DB server 404 at 414. Package metadata and package content are saved in object store 405 at 415, thereby creating the content package to transport. A confirmation is sent to tenant frontend at 416. The content management system may now receive package requests from other tenants, for example.

Figure 4B:
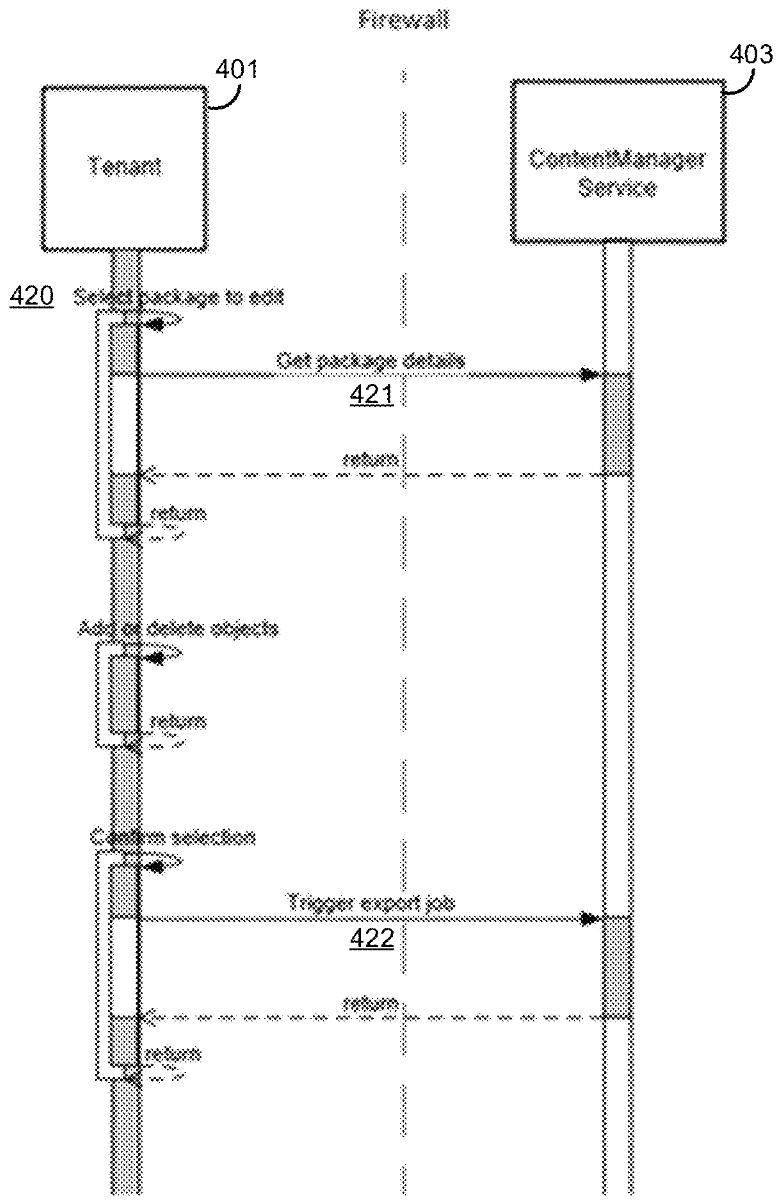
FIG. 4B illustrates an example flow diagram for triggering an export according to an embodiment.

FIG. 4B illustrates an example flow diagram for triggering an export according to an embodiment. At 420 a user of tenant frontend 401 selects a package to edit. At 421, tenant 401 sends gets package details from content manager service 403. A user may edit the content on frontend 401 and then trigger an export at 422. Content manager 403 then initiates an export as described further below. Sharing and exporting content may create a number of conflicting scenarios. For example, a PackageA may be created by UserA, which includes Story1, Model1, Model2, Dimension1, Connection1. However, multiple users could be modifying PackageA at same or different time periods. For instance, another UserC modifies PackageA by adding another object DataAction1 (in addition to Story1, Model1, Model2, Dimension1, Connection 1) and reexports PackageA. UserD may modify PackageA by deleting Model2 (contains Story1, Model1, Dimension1, Connection1) and reexports PackageA. Here, UserC and UserD are not aware of each other's action. If the changes by UserC and UserD are at different times, there is no loss of data. PackageA contains Story1, Model1, Dimension1, Connection1, DataAction1. However, if UserC and UserD data moves are triggered at overlapping times, there is chance to override, leading to loss of one of the users update, for example.

Figure 4C:
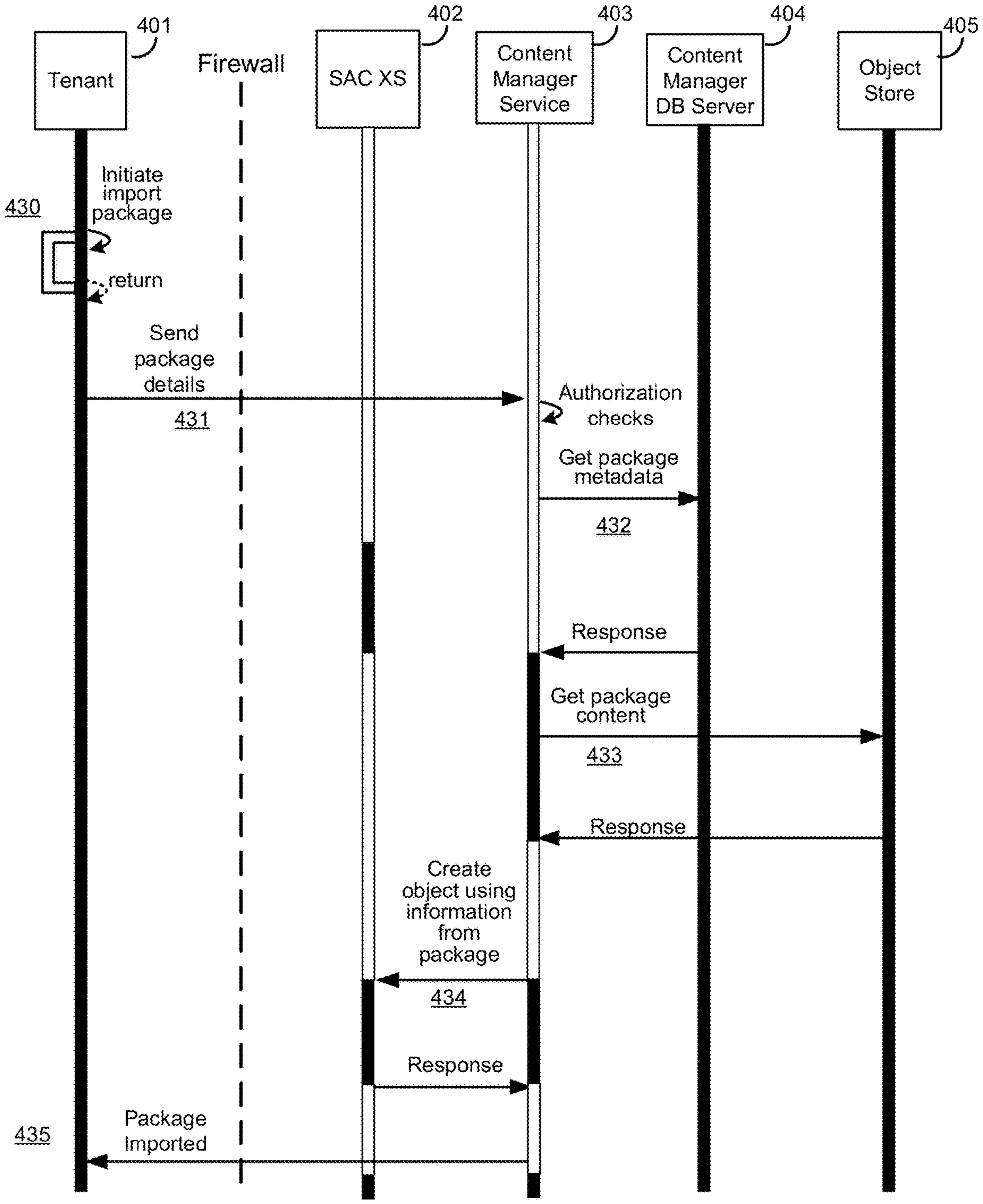
FIG. 4C illustrates an example flow diagram for importing data to a server according to an embodiment.

FIG. 4C illustrates an example flow diagram for importing data to a server according to an embodiment. The following illustrates a process for importing a package to a backend server (SAC XS) 402. At 430, a user logs-in to tenant 401 and clicks on a package to be imported. The packet summary is reviewed and import preferences and any object location may be updated as needed. An import is triggered at 431. Here, analytic content owned by each tenant is processed and stored in a backend server (SAC XS) 402. Content management system (CMS) receives the import package request from any tenants of server 402. Content manager service 403 gets package metadata from content manager DB server 404 at 432. The package metadata may be used to get package content from object store 405 at 433. Service 403 receives the package and sends the package to server 402 at 434. Content structures, such as objects, are created in server 402 using the information in the package, for example. The content is now imported to server 402. A confirmation of the package import is received by tenant 401 at 435.

One issue with important packages from a CMS to a server is that packages may contain common objects. If Tenant1 has packages:

PackageA—Story1, Model1, Model2, Dimension1, Connection1; and

PackageB—Story1, Model1, Currency3, then Story1, Model1 are common objects.

Therefore, if more than one user triggers import of packages containing the same set of objects at same time, there are chances of data overwrite. For example, the following scenario may occur. UserC creates (exports) Story1, adds a table view, and creates PackageA containing Story1 and its dependencies, and if UserC imports PackageA (e.g., at 4 PM and it takes an hour to complete) with an import order of: Dimension1, Connection1, Model1, Model2, Story1. UserD modifies Story1, adds a pie chart, a line chart (in addition to the above added table view), and creates (exports) PackageB containing Story1 and its dependencies, where UserD imports PackageB at 4:30 PM with an import order of: Currency3, Model1, Story1. For the above scenario, if PackageA and PackageB execute at non-overlapping times, there is no conflict. However, if PackageA import is ongoing when PackageB import is initiated, there is chance to override Story1, Modell objects. PackageB imports Story1 (table view, pie chart, line chart). PackageA imports Story1 (table view), and may overwriting changes made by UserD, for example. Note, generally, exported object structure is maintained so it can be recreated in another system. If new elements are added/removed from a package (story), the package in CMS will not be affected.

Figure 4D:
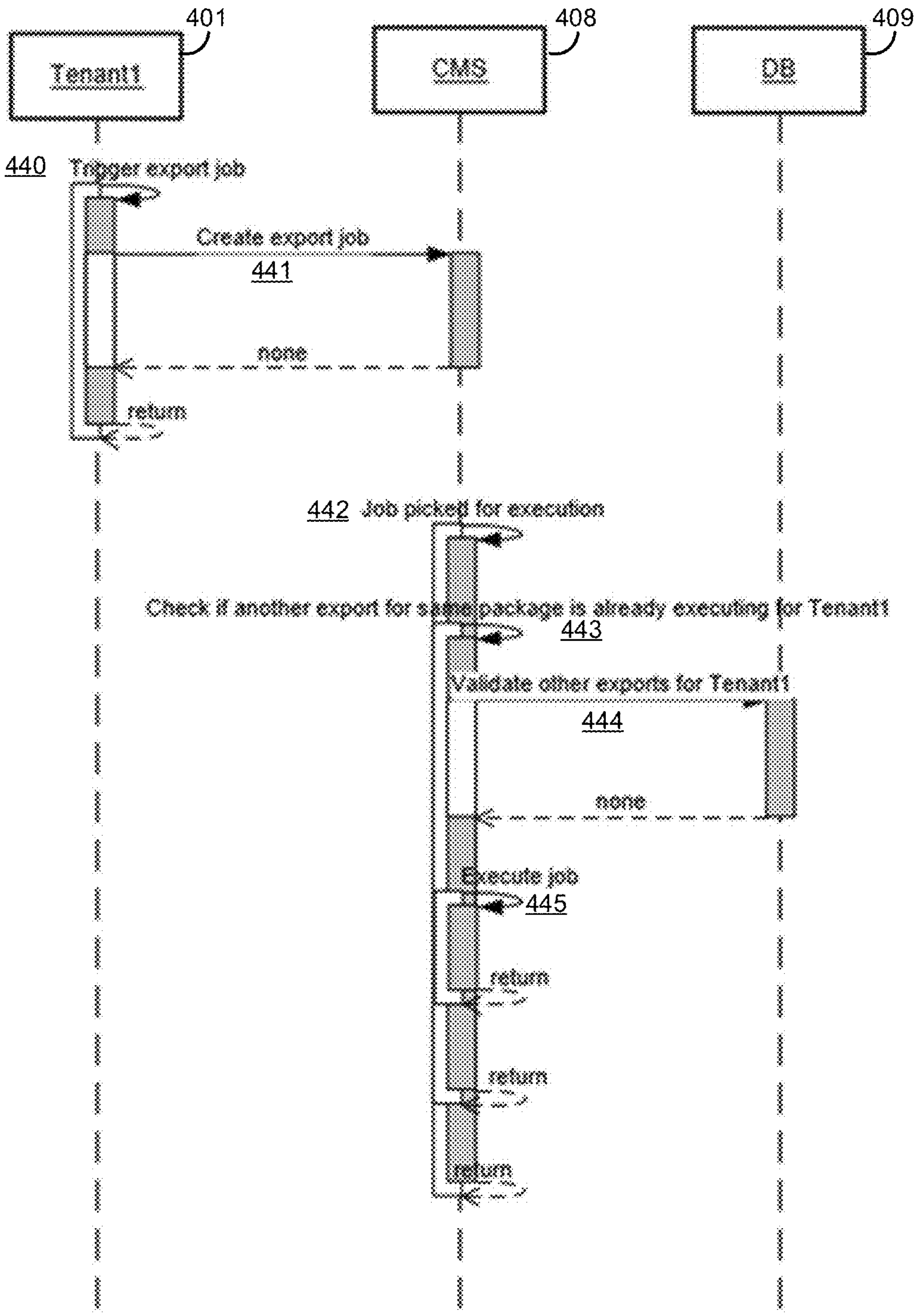
FIG. 4D illustrates an example flow diagram for moving data according to an embodiment.

Features and advantages of the present disclosure allow parallel transport post analysis of already executing jobs (package and/or content) for faster movement of data between systems without overlap or conflict to avoid data loss as described above. FIG. 4D illustrates a process for an export job. A user triggers new EXPORT job at 440 using tenant 401. At 441, the tenant creates the export job on CMS 408. At 442, a job is picked for execution. At 443, the CMS checks if another export for the same package is already executing on tenant 401. At 444, CMS 408 validates other exports for tenant 401. During validation, a query is sent to a database to check if there are any jobs running in the tenant. If so, the system determines if there are conflicting objects across running job and a current job, for example. CMS 408 may poll for pending jobs and check database (DB) 409 for executing export jobs running on the CMS for this tenant. If any pending jobs are executing for this tenant, the system checks if currently executing job is for same package on same tenant. If yes, then the current job can't be picked for execution and the job is returned to a job queue. Otherwise, the current job can be picked for execution. In various embodiments, the system checks if another job for a tenant is already executing, and if so, other jobs wait in a queue. Additionally, the system may check if an export for a same package is being requested multiple times, for example. The job is executed at 445.

Figure 4E:
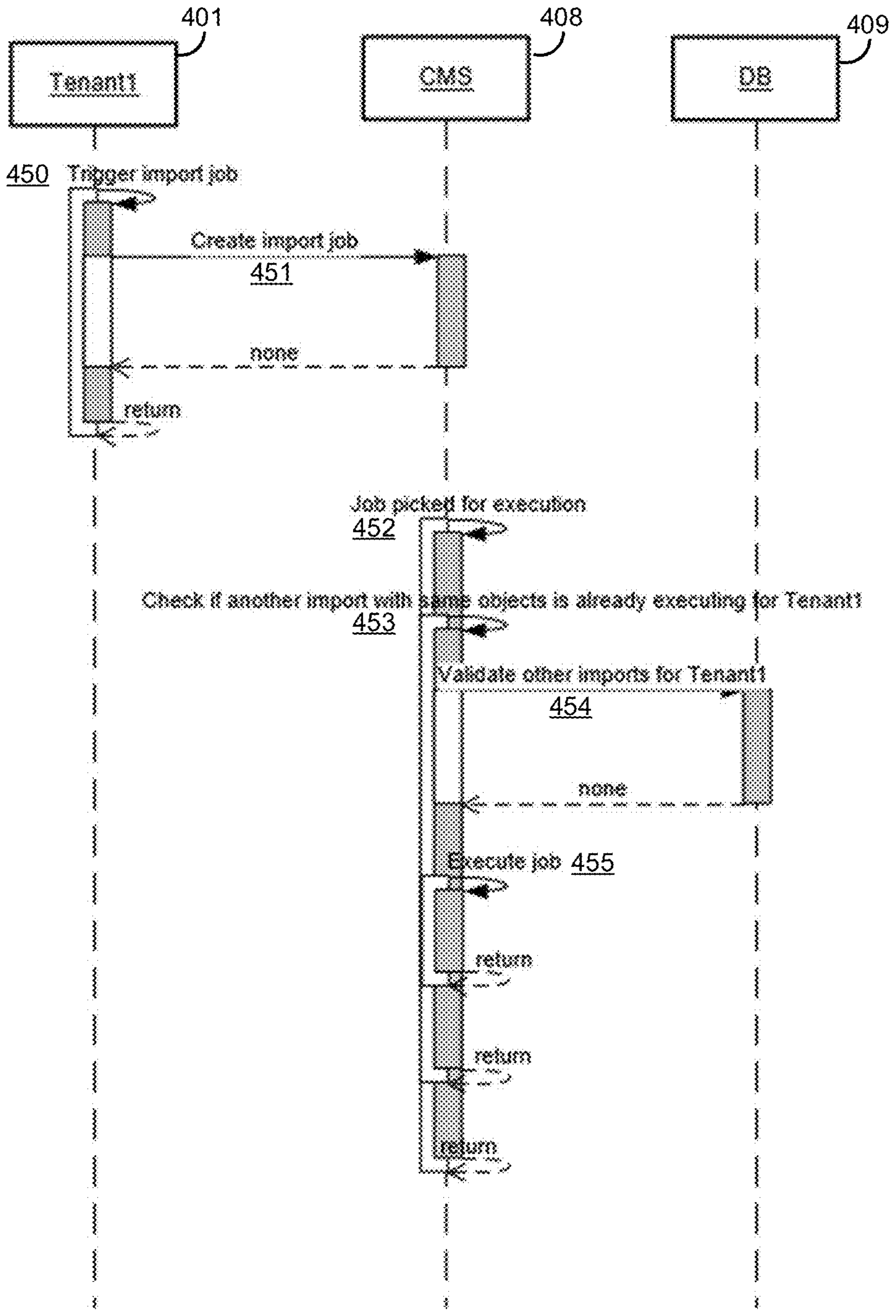
FIG. 4E illustrates an example flow diagram for moving data according to an embodiment.

FIG. 4E illustrates a process for an import job. A user triggers new IMPORT job at 450. At 451, tenant 401 sends CMS 408 a message to create a new import job. At 452, CMS 408 picks a job for execution. CMS 408 may poll for pending jobs. For instance, CMS 408 may check database 409 for executing import jobs for tenant 401. If any exist, the system may check if a currently executing job and a new job share same set of objects on same tenant at 453. The system may validate other imports for tenant 401 at 454, for example to determine if a currently executing job and a new job share same set of objects on same tenant. If another import with the same objects is already executing on tenant 401, then job can't be picked. and the job is returned to queue. Otherwise, the job can be picked for execution. The job is executed at 455.

Using the techniques described in the above example, an ACN supported package transport may be performed in parallel to reduce the time taken to export or import multiple packages, improve usage of resources (e.g., DB connection pool, number of instances and threads), and reduce time taken during tenant migration, which may involve bulk package transport.

Figure 5:
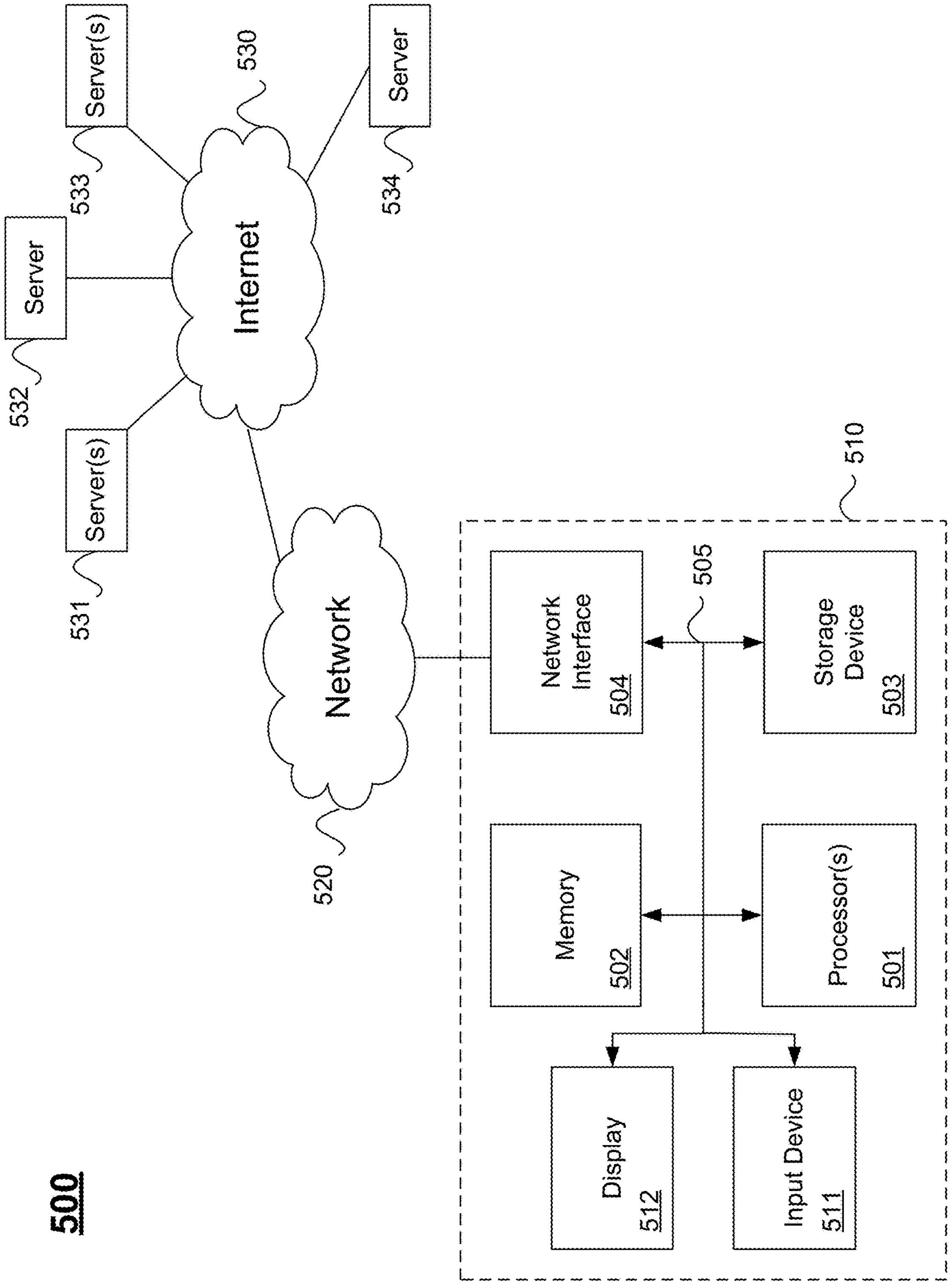
FIG. 5 illustrates hardware of a special purpose computing system configured according to the above disclosure.

FIG. 5 illustrates hardware of a special purpose computing system 500 configured according to the above disclosure. The following hardware description is merely one example. It is to be understood that a variety of computers topologies may be used to implement the above-described techniques. An example computer system 510 is illustrated in FIG. 5. Computer system 510 includes a bus 505 or other communication mechanism for communicating information, and one or more processor(s) 501 coupled with bus 505 for processing information. Computer system 510 also includes memory 502 coupled to bus 505 for storing information and instructions to be executed by processor 501, including information and instructions for performing some of the techniques described above, for example. Memory 502 may also be used for storing programs executed by processor(s) 501. Possible implementations of memory 502 may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, solid state disk, a flash or other non-volatile memory, a USB memory card, or any other electronic storage medium from which a computer can read. Storage device 503 may include source code, binary code, or software files for performing the techniques above, for example. Storage device 503 and memory 502 are both examples of non-transitory computer readable storage mediums (aka, storage media).

In some systems, computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses for coupling various components of the computer together, for example.

Computer system 510 also includes a network interface 504 coupled with bus 505. Network interface 504 may provide two-way data communication between computer system 510 and a local network 520. Network 520 may represent one or multiple networking technologies, such as Ethernet, local wireless networks (e.g., WiFi), or cellular networks, for example. The network interface 504 may be a wireless or wired connection, for example. Computer system 510 can send and receive information through the network interface 504 across a wired or wireless local area network, an Intranet, or a cellular network to the Internet 530, for example. In some embodiments, a frontend (e.g., a browser), for example, may access data and features on backend software systems that may reside on multiple different hardware servers on-prem 531 or across the network 530 (e.g., an Extranet or the Internet) on servers 532-534. One or more of servers 532-534 may also reside in a cloud computing environment, for example.

FURTHER EXAMPLES

Each of the following non-limiting features in the following examples may stand on its own or may be combined in various permutations or combinations with one or more of the other features in the examples below. In various embodiments, the present disclosure may be implemented as a system, method, or computer readable medium.

Embodiments of the present disclosure may include systems, methods, or computer readable media. In one embodiment, the present disclosure includes computer system comprising: at least one processor and at least one non-transitory computer readable medium (e.g., memory) storing computer executable instructions that, when executed by the at least one processor, cause the computer system to perform a method as described herein and in the following examples. In another embodiment, the present disclosure includes a non-transitory computer-readable medium storing computer-executable instructions that, when executed by at least one processor, perform a method as described herein and in the following examples.

In some embodiments, the method of moving data comprising: initiating an automated process to move data between a first computer system and a second computer system; instantiating a plurality of jobs to move data units between the first computer system and the second computer system; prior to execution of each job, determining if an overlap exists between data units of the jobs; and executing each particular job when no overlap exists between data units moved by a currently executing job and each particular job.

In some embodiments, the first computer system is an application server and the second computer system is a content management system.

In some embodiments, the content management system instantiates the plurality of jobs and wherein the data units are data packages comprising a plurality of data objects, metadata describing the plurality of data objects and dependencies between the data objects, and information summarizing the data package.

In some embodiments, the automated process to move data is a data import operation.

In some embodiments, determining if an overlap exists between data units of the jobs comprises determining if a currently executing job and a new job share a same set of objects, wherein when the currently executing job and the new job share the same set of objects, the new job is not executed.

In some embodiments, the automated process to move data is a data export operation.

In some embodiments, determining if an overlap exists between data units of the jobs comprises determining if a currently executing job and a new job operate on a same data package, wherein when the currently executing job and the new job operate on a same data package, the new job is not executed.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method of moving data comprising:
- initiating an automated process to move data between a first computer system and a second computer system;
- instantiating a plurality of jobs to move data units between the first computer system and the second computer system;
- placing the plurality of jobs in a job queue and selecting, by a content management system, a job from the job queue for execution;
- prior to execution of each job, determining if an overlap exists between data units of the jobs, wherein the overlap comprises a shared data object dependency across data packages, wherein determining if the overlap exists comprises:
  - querying a database to identify currently executing jobs associated with a same tenant; and
  - comparing data objects or data packages of the selected job with data objects or data packages of the currently executing jobs to identify conflicts;
  - when an overlap is identified, returning the selected job to the job queue without execution; and
- executing each particular job when no overlap exists between data units moved by a currently executing job and each particular job.

2. The method of claim 1, wherein the first computer system is an application server and the second computer system is a content management system.

3. The method of claim 2, wherein the content management system instantiates the plurality of jobs and wherein the data units are data packages comprising a plurality of data objects, metadata describing the plurality of data objects and dependencies between the data objects, and information summarizing the data packages.

4. The method of claim 3, wherein the automated process to move data is a data import operation.

5. The method of claim 4, wherein determining if an overlap exists between data units of the jobs comprises determining if a currently executing job and a new job share a same set of objects, wherein when the currently executing job and the new job share the same set of objects, the new job is not executed.

6. The method of claim 3, wherein the automated process to move data is a data export operation.

7. The method of claim 6, wherein determining if an overlap exists between data units of the jobs comprises determining if a currently executing job and a new job operate on a same data package, wherein when the currently executing job and the new job operate on a same data package, the new job is not executed.

8. A computer system comprising:

at least one processor;

at least one non-transitory computer readable medium storing computer executable instructions that, when executed by the at least one processor, cause the computer system to perform a method of moving data comprising:

initiating an automated process to move data between a first computer system and a second computer system;

instantiating a plurality of jobs to move data units between the first computer system and the second computer system;

placing the plurality of jobs in a job queue and selecting, by a content management system, a job from the job queue for execution;

prior to execution of each job, determining if an overlap exists between data units of the jobs, wherein the overlap comprises a shared data object dependency across data packages, wherein determining if the overlap exists comprises:

querying a database to identify currently executing jobs associated with a same tenant; and comparing data objects or data packages of the selected job with data objects or data packages of the currently executing jobs to identify conflicts;

when an overlap is identified, returning the selected job to the job queue without execution; and executing each particular job when no overlap exists between data units moved by a currently executing job and each particular job.

9. The computer system of claim 8, wherein the first computer system is an application server and the second computer system is a content management system.

10. The computer system of claim 9, wherein the content management system instantiates the plurality of jobs and wherein the data units are data packages comprising a plurality of data objects, metadata describing the plurality of data objects and dependencies between the data objects, and information summarizing the data packages.

11. The computer system of claim 10, wherein the automated process to move data is a data import operation.

12. The computer system of claim 11, wherein determining if an overlap exists between data units of the jobs comprises determining if a currently executing job and a new job share a same set of objects, wherein when the currently executing job and the new job share the same set of objects, the new job is not executed.

13. The computer system of claim 10, wherein the automated process to move data is a data export operation.

14. The computer system of claim 13, wherein determining if an overlap exists between data units of the jobs comprises determining if a currently executing job and a new job operate on a same data package, wherein when the currently executing job and the new job operate on a same data package, the new job is not executed.

15. A non-transitory computer-readable medium storing computer-executable instructions that, when executed by at least one processor, perform a method of moving data, the method comprising:

initiating an automated process to move data between a first computer system and a second computer system;

instantiating a plurality of jobs to move data units between the first computer system and the second computer system;

placing the plurality of jobs in a job queue and selecting, by a content management system, a job from the job queue for execution;

prior to execution of each job, determining if an overlap exists between data units of the jobs, wherein the overlap comprises a shared data object dependency across data packages, wherein determining if the overlap exists comprises:

querying a database to identify currently executing jobs associated with a same tenant; and comparing data objects or data packages of the selected job with data objects or data packages of the currently executing jobs to identify conflicts;

when an overlap is identified, returning the selected job to the job queue without execution; and executing each particular job when no overlap exists between data units moved by a currently executing job and each particular job.

16. The non-transitory computer-readable medium of claim 15, wherein the first computer system is an application server and the second computer system is a content management system.

17. The non-transitory computer-readable medium of claim 16, wherein the content management system instantiates the plurality of jobs and wherein the data units are data packages comprising a plurality of data objects, metadata describing the plurality of data objects and dependencies between the data objects, and information summarizing the data packages.

18. The non-transitory computer-readable medium of claim 17, wherein the automated process to move data is a data import operation.

19. The non-transitory computer-readable medium of claim 18, wherein determining if an overlap exists between data units of the jobs comprises determining if a currently executing job and a new job share a same set of objects, wherein when the currently executing job and the new job share the same set of objects, the new job is not executed.

20. The non-transitory computer-readable medium of claim 17, wherein the automated process to move data is a data export operation, and wherein determining if an overlap exists between data units of the jobs comprises determining if a currently executing job and a new job operate on a same data package, wherein when the currently executing job and the new job operate on a same data package, the new job is not executed.

* * * * *